(12) United States Patent
Pauls et al.

(10) Patent No.: US 7,748,456 B2
(45) Date of Patent: Jul. 6, 2010

(54) DUAL FUNCTIONAL COMPONENTS AND ASSOCIATED METHODS

(75) Inventors: Richard W. Pauls, Duncan, OK (US); Thomas D. Welton, Duncan, OK (US); David E. McMechan, Duncan, OK (US); Jason Bryant, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/502,656

(22) Filed: Aug. 11, 2006

(65) Prior Publication Data

US 2008/0035338 A1 Feb. 14, 2008

(51) Int. Cl.
*E21B 43/25* (2006.01)
*E21B 43/04* (2006.01)
*E21B 33/00* (2006.01)

(52) U.S. Cl. .............. 166/300; 166/305.1; 166/308.3; 166/278; 166/285

(58) Field of Classification Search ............ None
See application file for complete search history.

(56) References Cited

U.S. PATENT DOCUMENTS

| | | | | |
|---|---|---|---|---|
| 3,696,035 | A | 10/1972 | Nimerick | 252/8.55 R |
| 3,700,032 | A | 10/1972 | Terry et al. | 166/283 |
| 3,763,934 | A * | 10/1973 | Coulter et al. | 166/294 |
| 4,021,355 | A * | 5/1977 | Holtmyer et al. | 507/211 |
| 4,488,975 | A | 12/1984 | Almond | 507/203 |
| 5,095,987 | A | 3/1992 | Weaver et al. | 166/276 |
| 5,413,178 | A | 5/1995 | Walker et al. | 166/300 |
| 5,447,199 | A | 9/1995 | Dawson et al. | 166/300 |
| 5,759,964 | A | 6/1998 | Shuchart et al. | 507/209 |
| 5,806,597 | A | 9/1998 | Tjon-Joe-Pin et al. | 166/300 |
| 6,186,235 | B1 | 2/2001 | Tjon-Joe-Pin et al. | 166/300 |
| 6,213,213 | B1 * | 4/2001 | van Batenburg et al. | 166/300 |
| 6,422,314 | B1 | 7/2002 | Todd et al. | 166/312 |
| 6,454,008 | B1 | 9/2002 | Chatterji et al. | 166/308 |
| 6,494,263 | B2 | 12/2002 | Todd | 166/312 |
| 6,756,345 | B2 * | 6/2004 | Pakulski et al. | 507/246 |
| 6,810,959 | B1 | 11/2004 | Qu et al. | 166/300 |
| 6,877,563 | B2 | 4/2005 | Todd et al. | 166/312 |
| 7,021,383 | B2 | 4/2006 | Todd et al. | 166/307 |
| 7,090,015 | B2 | 8/2006 | Todd | 166/278 |
| 2002/0036088 | A1 | 3/2002 | Todd | 166/300 |
| 2003/0083403 | A1 | 5/2003 | Dawson et al. | 524/27 |
| 2004/0182575 | A1 | 9/2004 | Reddy et al. | 166/294 |
| 2004/0186024 | A1 | 9/2004 | Todd | 507/200 |
| 2004/0216875 | A1 | 11/2004 | Todd et al. | 166/278 |
| 2004/0238169 | A1 | 12/2004 | Todd et al. | 166/280.2 |
| 2006/0234872 | A1 | 10/2006 | Mirakyan et al. | 507/211 |
| 2008/0026958 | A1 * | 1/2008 | Todd et al. | 507/214 |

FOREIGN PATENT DOCUMENTS

| | | |
|---|---|---|
| EP | 1 223 207 A1 | 1/2002 |
| WO | WO 2008/017876 | 2/2008 |

OTHER PUBLICATIONS

Christensen, B.E., et al, Gelation of Periodate Oxidised Scleroglucan (Scleraldehyde), Carbohydrate Polymers 46 (2001) 241-248.
Foreign Search Report and Opinion (PCT Appl. No. GB 2004/002669), Dec. 3, 2004.
International Search Report and the Written Opinion of the International Searching Authority PCT/GB2007/003075, Aug. 13, 2007.
Foreign Search Report from a Related Counterpart Application, Nov. 19, 2007.

* cited by examiner

*Primary Examiner*—Zakiya W Bates
*Assistant Examiner*—Angela M DiTrani
(74) *Attorney, Agent, or Firm*—Robert A. Kent (57) ABSTRACT

Many methods and compositions are provided. One of the methods provided comprises the steps of: providing an aqueous treatment fluid that comprises a polysaccharide and a dual functional component, the aqueous treatment fluid having a first viscosity; allowing the dual functional component to interact with the polysaccharide such that the viscosity of the aqueous treatment fluid increases to a second viscosity, the second viscosity being greater than the first viscosity; placing the aqueous treatment fluid into a subterranean formation; and allowing the dual functional component to interact with the polysaccharide so as to reduce the second viscosity of the aqueous treatment fluid to a third viscosity, the third viscosity being less than the second viscosity. An example of a composition is a viscosified treatment fluid for treating subterranean formations comprising: an aqueous base fluid and an apparent cross linked reaction product of a polysaccharide and a dual functional component.

8 Claims, 5 Drawing Sheets

DUAL FUNCTIONAL COMPONENTS AND ASSOCIATED METHODS

BACKGROUND

This invention relates to methods of cross linking polysaccharides to form cross linked polysaccharides, and more particularly, to viscosified treatment fluids that are self-breaking. More particularly, the present invention provides "dual functional components" that are chemical compositions that have a dual functionality when interacting with polysaccharides in an aqueous treatment fluid.

Polysaccharides are carbohydrates in which tens, hundreds, or even thousands of simple sugars are linked together. Since they have no free anomeric hydroxyls (except for one at the end of the chain), they are not reducing sugars and do not show mutarotation. Cellulose, starch, and various galactomannans are some of the most-widely occurring polysaccharides. One common gelling agent used in subterranean treatment fluids is guar, a galactomannan type of polysaccharide which may be cross linked to yield a high gel strength for suspension, and yet relatively easily broken when desired (that is, the viscosity of the treatment fluid viscosified with guar may be reduced when desired). Because of its abundance, price, and geometry favorable to cross linking, guar is the most commonly used gelling agent in treatment fluids. Polysaccharides are commonly used to viscosity aqueous fluids to create, e.g., viscosified treatment fluids that inhibit particle settling by virtue of viscosity. If the polysaccharide is cross linked, these viscosified treatment fluids can approach near zero particle settling rates.

Viscosified treatment fluids are often used in industries such as the mining, explosive, and petroleum industries. Treatment fluids may be used in a variety of subterranean treatments, including, but not limited to, stimulation treatments and sand control treatments. As used herein, the term "treatment," or "treating," refers to any operation that uses a fluid in conjunction with a desired function and/or for a desired purpose. The term "treatment," or "treating," does not imply any particular action by the fluid or any particular component thereof.

In subterranean operations, one common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant," that are deposited in the fractures. The proppant particulates, inter alia, prevent the fractures from fully closing upon the release of hydraulic pressure, forming conductive channels through which fluids may flow to the well bore. Once at least one fracture is created and the proppant particulates are substantially in place, the fracturing fluid may be "broken" (i.e., the viscosity is reduced), and the fracturing fluid may be recovered from the formation.

Treatment fluids are also utilized in sand control treatments, such as gravel packing. In gravel-packing treatments, a treatment fluid suspends particulates (commonly referred to as "gravel particulates") for delivery to a desired area in a well bore, e.g., near unconsolidated or weakly-consolidated formation zones, to form a gravel pack to enhance sand control. One common type of gravel-packing operation involves placing a sand control screen in the well bore and packing the annulus between the screen and the well bore with the gravel particulates of a specific size to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered. In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment may end in a tip screen-out condition. In other cases, the fracturing treatment may be performed prior to installing the screen and placing a gravel pack.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important to control and/or reduce fluid-loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time, inter alia, for subsequent recovery of the fluid from the formation. Additionally, the viscosity also may help determine the open fracture width.

To increase the viscosity of the viscosified fluid, the polysaccharide component of the fluid may be cross linked. The term "cross linked" as used herein to refer to bonds between two or more molecules of given polysaccharide(s). Historically, there have been few good ways to make a sufficient cross linked microbial polysaccharide gel.

Also, the cross linking behavior of such conventional cross linking agents may become inhibited by components in the treatment fluid. For example, the composition of the water component of an aqueous treatment fluid can interfere with the cross linking behavior of conventional cross linking agents. Moreover, such conventionally cross linked polysaccharides may be heavily dependent on conditions such as pH and temperature. Because of this dependency and resultant instability, the viscosified treatment fluid may lose its viscosity prematurely, for instance, the proppant or gravel can drop out of a conventional viscosified treatment fluid before it has been placed in the desired interval in the subterranean formation neighboring the well bore.

At some point in time, e.g., after a viscosified treatment fluid has performed its desired function, the viscosity of the viscosified treatment fluid should be reduced. This is often referred to as "breaking the gel" or "breaking the fluid." This can occur by, inter alia, reversing the crosslink between cross linked polymer molecules, breaking down the molecules of the polymeric gelling agent, or breaking the crosslinks between polymer molecules. The use of the term "break" herein incorporates at least all of these mechanisms. Certain breakers that are capable of breaking treatment fluids comprising cross linked gelling agents are known in art. For example, breakers comprising sodium bromate, sodium chlorite, and other oxidizing agents have been used to reduce the viscosity of treatment fluids comprising cross linked polymers. Examples of such breakers are described in U.S. Pat. No. 5,759,964 to Shuchart, et al., and U.S. Pat. No. 5,413,178 to Walker, et al., the relevant disclosures of which are herein incorporated by reference. However, many of these breakers are only effective in reducing the viscosity of a treatment fluid at neutral-to-alkaline pH levels (e.g., above about pH 6). Excessive concentrations of those breakers and/or additional catalysts may be required to effectively reduce the viscosity of a treatment fluid at lower pH levels (e.g., below about pH 6). One should note that low pH may break some gels in some circumstances. High concentrations of breaker and/or additional catalysts may be problematic since they may, among other things, increase the cost and complexity of a treatment fluid, adversely affect other components of the treatment fluid, and/or leave damaging residues in the subterranean formations where they are used.

Thus, there are needs for improved subterranean formation treating fluids and methods whereby the fluids are not thermally unstable, do not produce insoluble residues, have high proppant carrying capacities, produce easily removed filter cake (or no filter cake), do not have to be hydrated in holding tanks for long periods of time, can have their properties changed during use, and can be recovered and reused if desired. Moreover, to avoid the problems associated with conventional breakers, it would be desirable to have cross linked polysaccharides that, inter alia, are "self-breaking," meaning that they can break at a desired time without the need for additional breakers.

SUMMARY

This invention relates to methods of cross linking polysaccharides to form cross linked polysaccharides, and more particularly, to viscosified treatment fluids that are self-breaking. More particularly, the present invention provides "dual functional components" that are chemical compositions that have a dual functionality when interacting with polysaccharides in an aqueous treatment fluid.

In one embodiment, the present invention provides a method of treating a subterranean formation comprising the steps of: providing an aqueous treatment fluid that comprises a polysaccharide and a dual functional component, the aqueous treatment fluid having a first viscosity; allowing the dual functional component to interact with the polysaccharide such that the viscosity of the aqueous treatment fluid increases to a second viscosity, the second viscosity being greater than the first viscosity; placing the aqueous treatment fluid into a subterranean formation; and allowing the dual functional component to interact with the polysaccharide so as to reduce the second viscosity of the aqueous treatment fluid to a third viscosity, the third viscosity being less than the second viscosity.

In another embodiment, the present invention provides a method comprising: preparing or providing a viscosified treatment fluid that comprises an aqueous base fluid, and an apparent cross linked reaction product of a polysaccharide and dual functional component; introducing the viscosified treatment fluid into the subterranean formation; and allowing the viscosified treatment fluid to break into a lower viscosity fluid without adding an additional breaker.

In another embodiment, the present invention provides a method comprising: preparing or providing a viscosified treatment fluid that comprises an aqueous base fluid, and an apparent cross linked reaction product of a polysaccharide and dual functional component; introducing the viscosified treatment fluid into the subterranean formation at a pressure sufficient to create or enhance a fracture therein or in such a manner as to form a gravel pack therein; and allowing the viscosified treatment fluid to break into a lower viscosity fluid without adding an additional breaker.

In another embodiment, the present invention provides a viscosified treatment fluid for treating subterranean formations comprising: an aqueous base fluid and an apparent cross linked reaction product of a polysaccharide and a dual functional component.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

This invention relates to methods of cross linking polysaccharides to form cross linked polysaccharides, and more particularly, to viscosified treatment fluids that are self-breaking. More particularly, the present invention provides "dual functional components" that are chemical compositions that have a dual functionality when interacting with polysaccharides in an aqueous treatment fluid. The terms "dual functional" or "dual functionality" as used herein refer to the apparent effect that the components have on the viscosity of aqueous treatment fluids as a result of their interaction with a polysaccharide(s) contained therein. As a result of their dual functionality, a measurable change in the viscosity of the aqueous treatment fluid can be observed. For instance, assume at time$_1$ (T$_1$), an aqueous treatment fluid has a viscosity$_1$ (V$_1$). By utilizing a dual functional component of the present invention, at T$_2$, the aqueous treatment fluid should have a V$_2$, and at T$_3$, the aqueous treatment fluid should have a V$_3$.

One of the many benefits of the present invention is that it provides viscosified treatment fluids that have desirable sand transport properties with low gel loadings. These viscosified treatment fluids then break without the need for an additional breaker. The dual functional components used in the present invention are single chemical compositions that are thought to both crosslink the polysaccharide polymer, and after a delayed time period, also break the viscous cross linked aqueous treating fluid containing the polysaccharide. A rise in viscosity of the treatment fluid and a subsequent decrease in viscosity may be observed. These types of viscosified treatment fluids may also be re-healing as compared to some permanent metal crosslinked systems. Additionally, the viscosified treatment fluids of the present invention should be nondamaging to the subterranean formation in which they are used.

The present invention provides improved methods of treating portions of subterranean formations penetrated by well bores where the subterranean formations have temperatures in the range of from about 0° F. up to about 400° F., 80° F. to 350° F. preferably. The methods basically utilize a viscosified treatment fluid that comprises an aqueous base fluid, and an apparent cross linked reaction product of a polysaccharide and dual functional component. The term "an apparent cross linked reaction product of a polysaccharide and dual functional component" as used herein refers to what appears to be a cross linked reaction product of a polysaccharide and dual functional component but may not be truly cross linked. With time and temperature, the viscosified treatment fluids of the present invention break without the addition of an additional breaker. In one embodiment, a method of the present invention for treating a subterranean formation penetrated by a well bore is comprised of the following steps: preparing or providing a viscosified treatment fluid that comprises an aqueous base fluid, a polysaccharide and a dual functional component; introducing the viscosified treatment fluid into the subterranean formation; and allowing the viscosified treatment fluid to break into a lower viscosity fluid that may be recovered at the surface if desired.

The viscosified treatment fluids of the present invention may be used for carrying out a variety of subterranean well treatments, including, but not limited to, fracturing, gravel packing, frac-packing, and plugging. They may also be used as diverting agents, conformance agents, fluid loss pills, and as gel pigs if desired. The intended end use will dictate the viscosities needed for the fluid, e.g., gel pigs may require a higher viscosity whereas a fracturing fluid may require a lower viscosity. One of ordinary skill in the art with the benefit of this disclosure will recognize the appropriate viscosity for a chosen application.

The aqueous base fluids used in the treatment fluids of the present invention may comprise fresh water, saltwater (e.g., water containing one or more salts dissolved therein), brine, seawater, or derivatives and combinations thereof. Generally, the water may be from any source, treated or untreated, provided that it does not contain certain concentrations of components that might adversely affect the stability and/or performance of the treatment fluids of the present invention, for example, copper ions, iron ions, or certain types of organic materials (e.g., lignin). In certain embodiments, the density of the aqueous base fluid can be increased, among other purposes, to provide well control properties and/or provide additional particle transport and suspension in the treatment fluids of the present invention. In certain embodiments, the pH of the aqueous base fluid may be adjusted (e.g., by a buffer or other pH adjusting agent), among other purposes, and/or to reduce the viscosity of the treatment fluid. In these embodiments, the pH may be adjusted to a specific level, which may depend on, among other factors, the types of gelling agents, cross linking agents, and/or breakers included in the treatment fluid. One of ordinary skill in the art, with the benefit of this disclosure, will recognize when such density and/or pH adjustments are appropriate.

Suitable polysaccharides include xanthan, scleroglucan, diutan, and the like. Other suitable examples include guar, modified guar, hydroxyethylcellulose, modified hydroxyethylcellulose, and modifications, derivatives, and combinations thereof. In certain embodiments, the polysaccharide is present in the viscous cross linked aqueous treatment fluids of the present invention in an amount in the range of from about 0.05% to about 10% by weight of water therein, more preferably in an amount of from about 0.5% to about 0.75%. For some applications, from about 0.1% to about 1% may be appropriate. The particular amount to use will be dictated by the application to which the treatment fluid will be put, as recognized by one skilled in the art with the benefit of this disclosure. Some applications may require more, while others may require less.

The dual functional components used in the present invention are chemical compositions that appear to have a dual functionality when interacting with a polysaccharide in an aqueous treatment fluid. The term "dual functional" refers to the apparent effect that the components have on the viscosity of aqueous treatment fluids as a result of their interaction with a polysaccharide contained therein. As a result of their dual functionality, a measurable change in the viscosity of the aqueous treatment fluid can be observed. For instance, assume at $time_1$ ($T_1$), an aqueous treatment fluid has a $viscosity_1$ ($V_1$). By utilizing a dual functional component of the present invention, at $T_2$, the aqueous treatment fluid should have a $V_2$, and at $T_3$, the aqueous treatment fluid should have a $V_3$. The dual functional components are thought to crosslink the polysaccharide, and thereby increase the viscosity of the treatment fluid for a period of time. The particular time depends on the bottom hole temperature of the subterranean formation being treated, and the amount of dual functional component utilized. After the period of time in the subterranean formation, the dual functional component is thought to act as a breaker for the treatment fluid, resulting in a reduction in the viscosity of the fluid. The fluid then can be recovered from the subterranean formation. As is well understood by those skilled in the art, when the treatment fluid contains suspended particulate gravel or proppant material, the particulate gravel or proppant material may be deposited in the subterranean formation or in fractures formed therein when the treatment fluid is broken into a lower viscosity fluid.

Suitable dual functional components include oxidizers. Specific suitable examples include, but are not limited to, salts of perborates, salts of permanganates, salts of percarbonates, sodium perborate, sodium persulfate, potassium persulfate, ammonium persulfate, sodium permanganate, potassium permanganate, magnesium permanganate, calcium permanganate, sodium percarbonate, potassium percarbonate, calcium peroxide, and magnesium peroxide. Derivatives and combinations of these may also be suitable. For hydroxyethylcellulose polysaccharides, magnesium peroxide may be preferred because magnesium peroxide produces hydrogen peroxide, which is useful for breaking down the hydroxyethylcellulose. In certain embodiments, the dual functional component is present in the viscous cross linked aqueous treatment fluids of the present invention in an amount in the range of from about 0.001% to about 3% by weight of the water therein.

The treatment fluids of the present invention optionally may comprise one or more additional additives known in the art, including, but not limited to, fluid loss control additives, gel stabilizers, gas (e.g., carbon dioxide or nitrogen), salts (e.g., KCl), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, surfactants, catalysts, clay control agents, biocides, friction reducers, particulates (e.g., proppant particulates, gravel particulates), nonemulsifiers, solvents, mutual solvents, paraffin inhibitors, asphaltene inhibitors, hydrate inhibitors, derivatives thereof, and combinations thereof. For example, a gel stabilizer compromising sodium thiosulfate may be included in certain treatment fluids of the present invention. Individuals skilled in the art, with the benefit of this disclosure, will recognize the types of additives that may be suitable for a particular application of the present invention. For example, particulates may be included in the treatment fluids of the present invention in certain types of subterranean operations, including fracturing operations, gravel-packing operations, and the like. Any sort of particulates suitable for use in subterranean applications may be used.

The treatment fluids of the present invention may be prepared using any suitable methodology. In some embodiments, they may be prepared "on the fly." For example, the dual functional components may be injected into a stream of the treatment fluid comprising an aqueous fluid and a polysaccharide during pumping. Other additives, such as those described above, may be combined with the treatment fluid of the present invention as desired for a particular application.

In one embodiment, the present invention provides a method of treating a subterranean formation comprising the steps of: providing an aqueous treatment fluid that comprises a polysaccharide and a dual functional component, the aqueous treatment fluid having a first viscosity; allowing the dual functional component to interact with the polysaccharide such that the viscosity of the aqueous treatment fluid increases to a second viscosity, the second viscosity being greater than the first viscosity; and allowing the dual functional component to interact with the polysaccharide so as to reduce the second viscosity of the aqueous treatment fluid to a third viscosity, the third viscosity being less than the second viscosity.

In one embodiment, a method of the present invention for placing a gravel pack in a subterranean formation penetrated by a well bore comprises the following steps. A viscosified treatment fluid that comprises an aqueous base fluid, a polysaccharide, a dual functional component, and suspended particulate material is prepared or provided. The particulate material included in the fluid may be selected from the group consisting of preferably graded sand, bauxite, ceramic materials, glass materials, fibers, plastics, and polymer beads. The particulate material may be included in the viscosified treatment fluid in a general amount in the range of from about 1% to about 300% by weight of the aqueous base fluid in the viscosified treatment fluid. The viscosified treatment fluid is placed into the subterranean formation, and at a later point in time, is allowed to break into a low viscosity fluid whereby the particulate material is deposited in the subterranean formation so as to form a gravel pack.

A method of this invention for fracturing a subterranean formation penetrated by a well bore and depositing particulate material in a fracture formed or enhanced therein comprises the following steps. A viscosified treatment fluid that comprises an aqueous base fluid, a polysaccharide, a dual functional component, and suspended particulate material is prepared or provided. Examples of the suspended particulate material in the fracturing fluid include, but are not limited to, graded sand, bauxite, ceramic materials, glass materials, and polymer beads. The suspended particulate material is generally present in the fluid in an amount in the range of from about 10% to about 250% by weight of the water in the fracturing fluid. Of these, graded sand is generally preferred. The viscosified treatment fluid is introduced into the subterranean formation at a rate and pressure sufficient to form or enhance a fracture in the subterranean formation. After some period of time, the viscosified treatment fluid is allowed to break into a lower viscosity fluid whereby the particulate material may be deposited in at least one fracture and the lower viscosity fluid may be recovered.

Another method of the present invention for treating a subterranean formation penetrated by a well bore comprises the steps of: preparing or providing a viscosified treatment fluid that comprises an aqueous base fluid, a polysaccharide, a dual functional component; introducing the viscosified treatment fluid into the subterranean formation; and allowing the viscosified treatment fluid to break into a lower viscosity fluid.

A preferred viscosified treatment fluid of this invention for treating subterranean formations comprises: an aqueous base fluid, and an apparent cross linked reaction product of a polysaccharide and a dual functional component.

To facilitate a better understanding of the present invention, the following examples of certain aspects of some embodiments are given. In no way should the following examples be read to limit, or define, the entire scope of the invention.

EXAMPLES

As shown in FIGS. 1-4, four samples were prepared and their viscosities at 37 s$^{-1}$ was measured (using a Brookfield PVS, SS—Steady Shear with a Brookfield PVS B2 bob) as a function of time as the samples were plunged into a 150° F. oil bath to raise the samples' temperature from 77° F. to 150° F. under a continuous shear of 37 s−1. The samples were prepared by adding 40 pptg of xanthan (WG-37) to Duncan, Okla. tap water, a sodium hydroxide solution (MO-67) to raise the pH above 7.0, and 8 gptg of a 10 w/w % solution/slurry of potassium permanganate in Duncan, Okla. tap water. The final solution pH of the four samples listed in FIG. 1 was 7.0 (no sodium hydroxide added), 10.1, 10.3, 11.3. The viscosity of the fluid at neutral pH did not vary over time; whereas, the viscosities of the fluids with pH greater than 10 showed an initial growth in viscosity followed by a decay in viscosity over time. It appears that the rate of decay in the fluid viscosity increases with increasing pH. Note that the only adjustable parameter in this data set is the amount of NaOH used. This seems to have an effect on the results. As indicated by FIGS. 1-4, inter alia, the dual functional component appears to both gel/viscosify the fluid and then eventually break the fluid.

Figure 1:
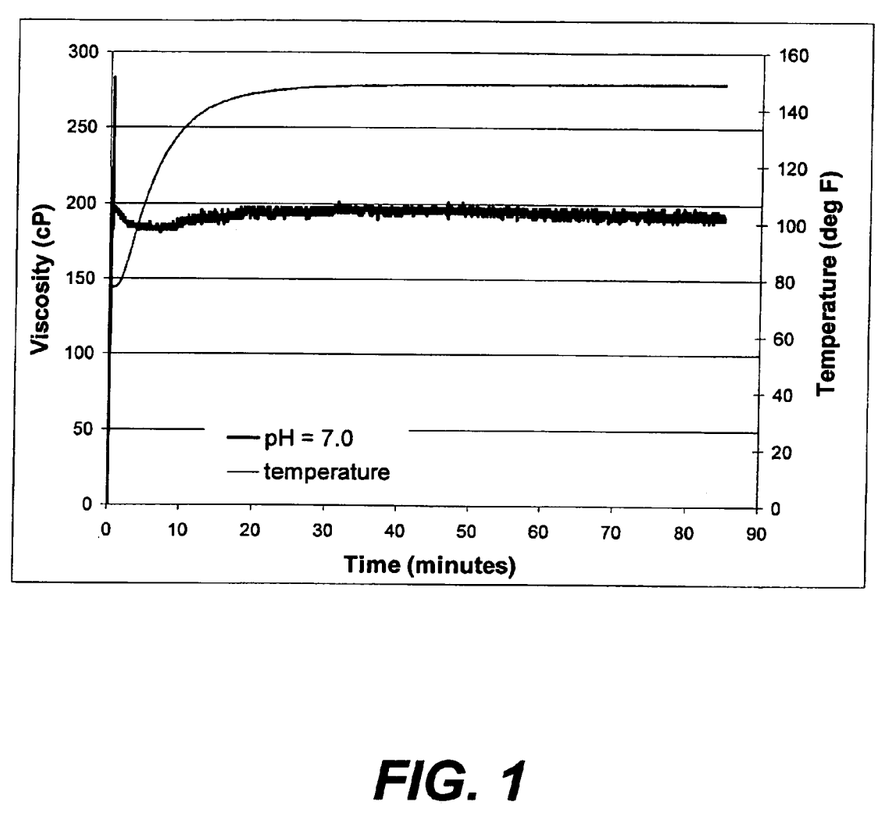
FIG. 1 illustrates certain viscosities as described in the Examples section.
Figure 2:
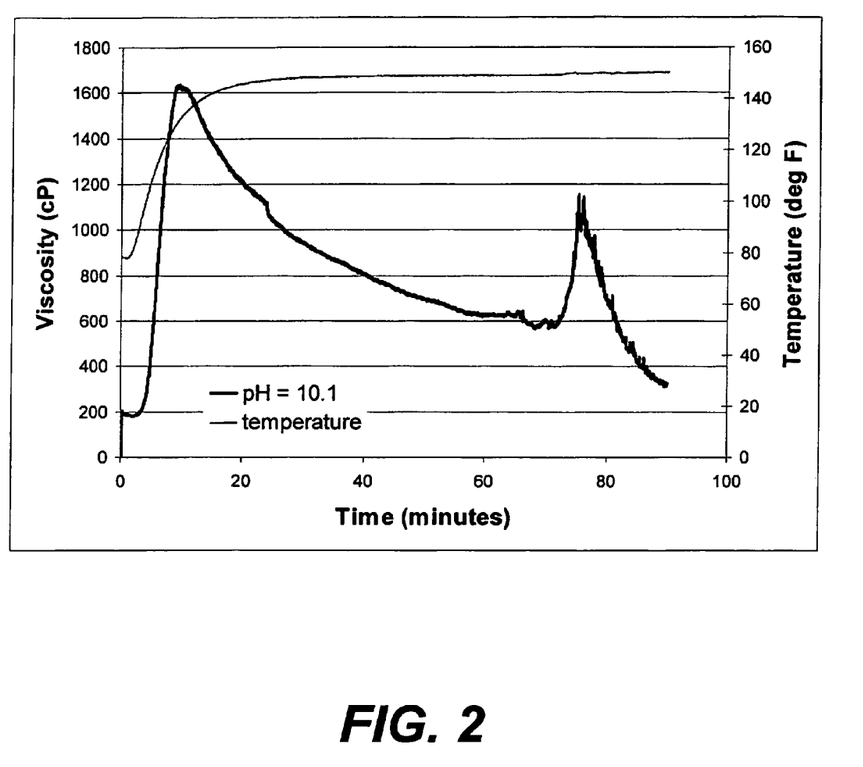
FIG. 2 illustrates certain viscosities as described in the Examples section.
Figure 3:
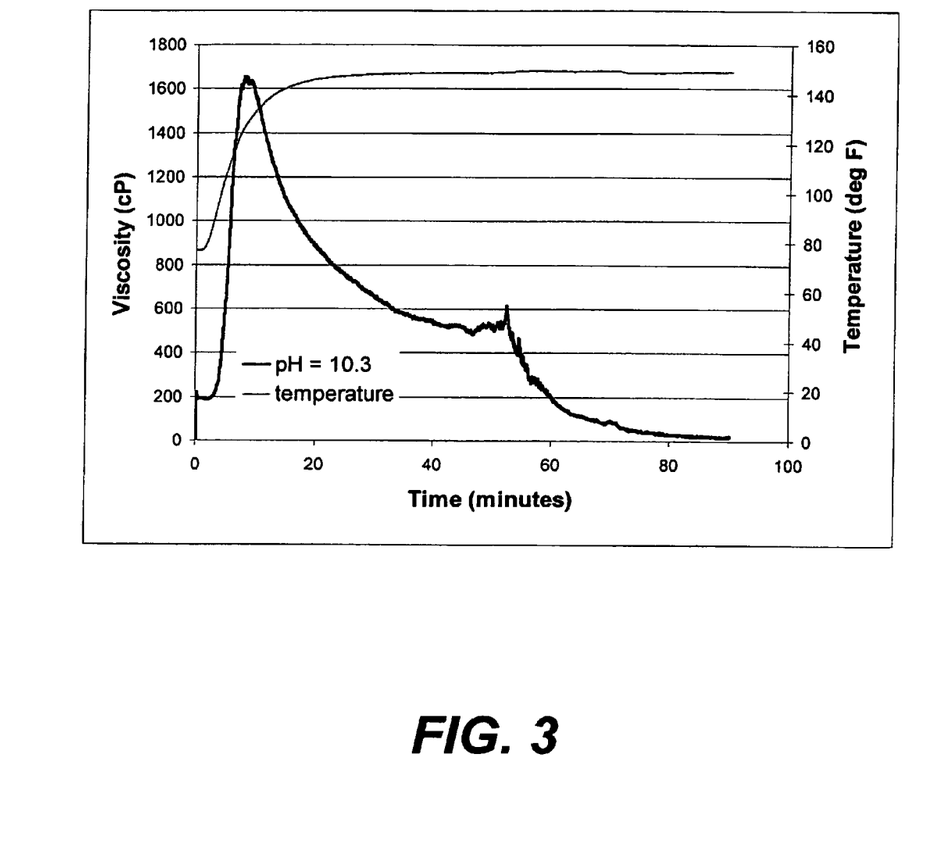
FIG. 3 illustrates certain viscosities as described in the Examples section.
Figure 4:
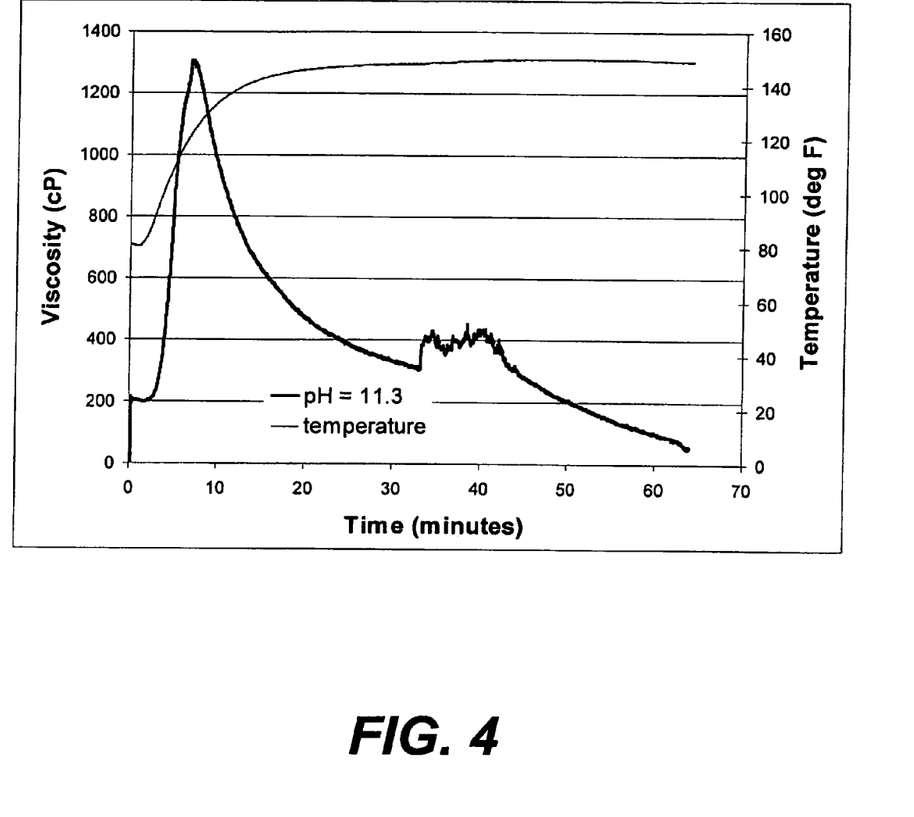
FIG. 4 illustrates certain viscosities as described in the Examples section.
Figure 5:
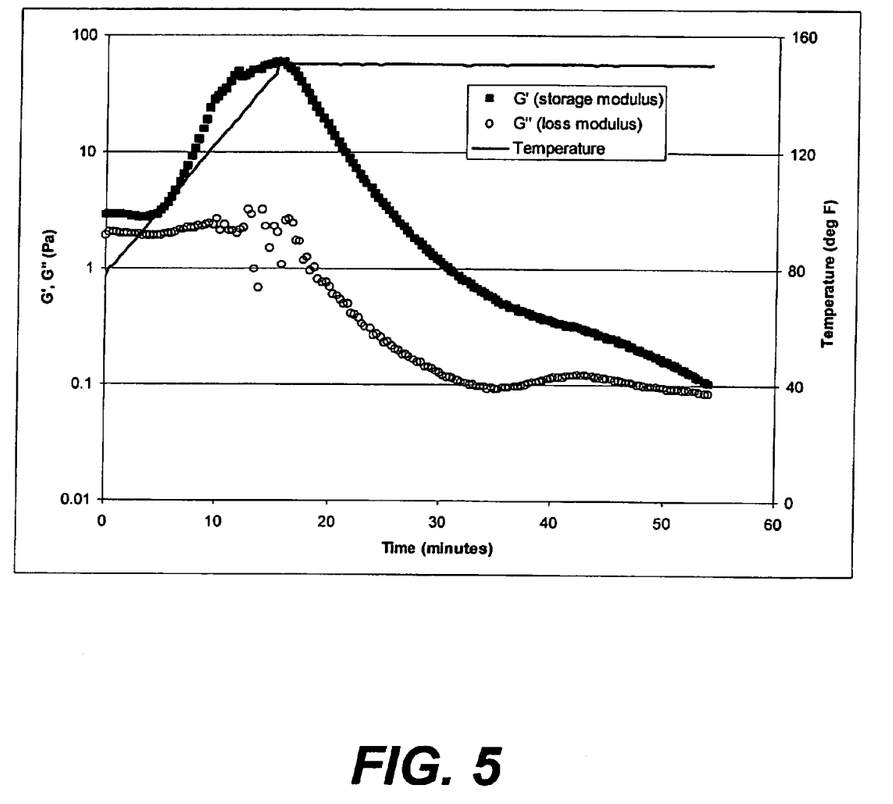
FIG. 5 illustrates certain viscosities as described in the Examples section.

Small-amplitude oscillatory shear was used to study the appearance and decay of a gel network containing 40 pptg Xanthan (WG-37), an amount of sodium hydroxide solution to raise the gel solution pH to 11.3, and 4 gptg of a 10 w/w % solution/slurry of potassium permanganate in Duncan, Okla. tap water. The oscillation experiments were performed on a StressTech from Reologica instruments using a cup and bob fixture under a frequency of 1 radians/second and a stress amplitude of 0.5 Pascals. The temperature of the fluid was increased from 77° F. to 150° F. The onset of a gel network is apparent as G' grows to a maximum of 60 Pascals, and the gel network slowly decays as G' approaches 0.1 Pascals in about 1 hour. As shown in FIG. 2, which is labeled "SAOS (150 deg F.)," one sample was prepared and its viscoelastic properties were measured (using an ATS Reologica StressTech, SAOS—Small-Amplitude Oscillatory Shear using cup and bob geometry on a StressTech from Reologica Instruments) with a stress amplitude of 0.5 Pa and a frequency of 1 rad/s. The storage (G') and the loss (G") moduli were measured as a function of time as the samples were heated to 150° F. The sample contained 40 ppt of xanthan, and to that sample 2 gpt of 7.9 M NaOH and 8 gpt of a 5 wt % KMnO$_4$ solution in water was added. By examining the growth and decay of the storage modulus (G') in FIG. 5, it is apparent that the fluid is both gelled/viscosified and then broken with the addition of a dual functional component.

In another example, 1 g of xanthan was dispersed in 200 ml of slightly acidified water (pH of approximately 4). This was basified (pH of approximately 10) and hydrated for 340 minutes. To this was added 0.25 g potassium permanganate. This gel slowly (over approximately 5 minutes) cross linked. It was stable at 150° F. and broke between 150° F. and 175° F. within 1 hour. Similar results were seen for sodium and potassium persulfate.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of treating a subterranean formation comprising:
    providing an aqueous treatment fluid that comprises a polysaccharide and a dual functional component comprising at least one oxidizer selected from the group consisting of: sodium persulfate; potassium persulfate; and ammonium persulfate, the aqueous treatment fluid having a first viscosity;
    allowing the dual functional component to interact with the polysaccharide so as to increase the first viscosity of the aqueous treatment fluid to a second viscosity, the second viscosity being greater than the first viscosity;
    placing the aqueous treatment fluid into a subterranean formation; and
    allowing the dual functional component to interact with the polysaccharide so as to reduce the second viscosity of the aqueous treatment fluid to a third viscosity, the third viscosity being less than the second viscosity.

2. The method of claim 1 wherein the third viscosity is less than or equal to the first viscosity.

3. The method of claim 1 wherein the aqueous treatment fluid comprises an apparent cross linked reaction product of a polysaccharide and dual functional component when the aqueous treatment fluid is at the second viscosity.

4. The method of claim 1 wherein the polysaccharide comprises at least one polysaccharide selected from the group consisting of: xanthan; sclerogtucan; diutan; a guar; a modified guar; hydroxyethylcellulose; a modified hydroxyethylcellulose; any modification thereof; any derivative thereof; and any combination thereof.

5. The method of claim 1 wherein the aqueous treatment fluid is introduced into the subterranean formation as part of a fracturing treatment, part of a gravel packing method, part of a frac-packing method, a plug, a pill, a diverting agent, a conformance agent, or a gel pig.

6. The method of claim 1 wherein the subterranean formation has a temperature of about 0° F. up to about 400° F.

7. The method of claim 1 wherein the aqueous treatment fluid comprises at least one aqueous fluid selected from the group consisting of: fresh water; saltwater; brine; seawater; any derivative thereof; and any combination thereof.

8. The method of claim 1 wherein the aqueous treatment fluid further comprises at least one additive selected from the group consisting of: a fluid loss control additive; a gel stabilizer; a gas; a salt; a pH-adjusting agent; a buffer; a corrosion inhibitor; a dispersant; a flocculant; an acid; a foaming agent; an antifoaming agent; an $H_2S$ scavenger; a lubricant; an oxygen scavenger; a weighting agent; a scale inhibitor; a surfactant; a catalyst; a clay control agent; a biocide; a friction reducer; a particulate; a nonemulsifier; a solvent; a mutual solvent; a paraffin inhibitor; an asphaltene inhibitor; a hydrate inhibitor; any derivative thereof; and any combination thereof.

* * * * *